United States Patent
Boardman (10) Patent No.: US 12,007,117 B1
(45) Date of Patent: Jun. 11, 2024

(54) FUEL-AIR MIXER FOR TURBINE ENGINE COMBUSTION SECTION

(71) Applicant: Raytheon Technologies Corporation, Farmington, CT (US)

(72) Inventor: Gregory Boardman, Owens Cross Roads, AL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/120,820

(22) Filed: Mar. 13, 2023

(51) Int. Cl.
  *F23R 3/28* (2006.01)
  *F02C 7/22* (2006.01)
  *F23D 14/64* (2006.01)

(52) U.S. Cl.
  CPC .............. *F23R 3/286* (2013.01); *F02C 7/22* (2013.01); *F23D 14/64* (2013.01); *F05D 2220/323* (2013.01); *F05D 2240/36* (2013.01)

(58) Field of Classification Search
  CPC ........ F23D 14/48; F23D 14/58; F23D 14/583; F23D 14/62; F23D 14/64; F23D 2206/10; F23R 3/14; F23R 3/283; F23R 3/286
  See application file for complete search history.

(56) References Cited

U.S. PATENT DOCUMENTS

| | | | | |
|---|---|---|---|---|
| 5,220,795 A | * | 6/1993 | Dodds | F23R 3/42 60/752 |
| 5,307,634 A | * | 5/1994 | Hu | F23C 7/002 60/737 |
| 8,312,724 B2 | | 11/2012 | Dai | |
| 9,482,433 B2 | | 11/2016 | Lee | |
| 10,054,312 B2 | | 8/2018 | Dai | |
| 10,267,524 B2 | | 4/2019 | Lee | |
| 10,823,416 B2 | | 11/2020 | Patel | |
| 11,668,462 B1 | * | 6/2023 | Benjamin | F23R 3/50 60/752 |
| 2009/0111063 A1 | * | 4/2009 | Boardman | F23R 3/286 431/352 |
| 2011/0271682 A1 | * | 11/2011 | Sandelis | F23C 7/004 60/737 |
| 2012/0151930 A1 | * | 6/2012 | Patel | F23R 3/286 60/746 |
| 2019/0264913 A1 | * | 8/2019 | Johansson | F23D 14/78 |

* cited by examiner

*Primary Examiner* — Scott J Walthour
(74) *Attorney, Agent, or Firm* — Getz Balich LLC (57) ABSTRACT

An apparatus is provided for a turbine engine. This apparatus includes a fuel-air mixer. The fuel-air mixer includes an inner passage, a sidewall, a fuel nozzle, an air swirler and a first quench aperture. The inner passage extends axially along an axis within the fuel-air mixer. The sidewall extends circumferentially around and axially along the inner passage. The fuel nozzle is configured to direct fuel into the inner passage. The air swirler is configured to direct swirled air into the inner passage for mixing with the fuel. The first quench aperture is configured to direct quench air into the inner passage to quench combustion products generated by combusting a mixture of the fuel and the swirled air within the inner passage.

19 Claims, 8 Drawing Sheets

FUEL-AIR MIXER FOR TURBINE ENGINE COMBUSTION SECTION

BACKGROUND OF THE DISCLOSURE

1. Technical Field

This disclosure relates generally to a turbine engine and, more particularly, to a fuel-air mixer for the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. While known hydrogen combustion systems have various advantages, there is still room in the art for improvement.

SUMMARY OF THE DISCLOSURE

According to an aspect of the present disclosure, an apparatus is provided for a turbine engine. This apparatus includes a fuel-air mixer. The fuel-air mixer includes an inner passage, a sidewall, a fuel nozzle, an air swirler and a first quench aperture. The inner passage extends axially along an axis within the fuel-air mixer. The sidewall extends circumferentially around and axially along the inner passage. The fuel nozzle is configured to direct fuel into the inner passage. The air swirler is configured to direct swirled air into the inner passage for mixing with the fuel. The first quench aperture is configured to direct quench air into the inner passage to quench combustion products generated by combusting a mixture of the fuel and the swirled air within the inner passage.

According to another aspect of the present disclosure, another apparatus is provided for a turbine engine. This apparatus includes a fuel-air mixer. The fuel-air mixer includes an inner passage, a sidewall, a fuel nozzle, an air swirler and a plurality of cooling apertures. The inner passage extends axially along an axis within the fuel-air mixer. The sidewall forms an outer peripheral boundary of the inner passage within the fuel-air mixer. The fuel nozzle includes a plurality of fuel outlets arranged in an array about the axis. Each of the fuel outlets is configured to inject fuel in a radial inward direction into the inner passage towards the axis. The air swirler are configured to direct swirled air into the inner passage to mix with the fuel. The cooling apertures extend through the sidewall. Each of the cooling apertures is configured to direct cooling air into the inner passage.

According to still another aspect of the present disclosure, another apparatus is provided for a turbine engine. This apparatus includes a fuel-air mixer. The fuel-air mixer includes an inner passage, a sidewall, a fuel nozzle, an air swirler, a shell and a cooling cavity formed radially between the sidewall and the shell. The inner passage extends axially along an axis within the fuel-air mixer. The sidewall forms an outer peripheral boundary of the inner passage within the fuel-air mixer. The fuel nozzle is configured to direct fuel into the inner passage. The air swirler is configured to direct swirled air into the inner passage to mix with the fuel. The shell extends axially along and circumferentially about the sidewall. The shell includes one or more cooling apertures configured to direct cooling air radially into the cooling cavity to impinge against the sidewall.

The fuel-air mixer may also include a quench aperture fluidly coupled with and extending between the cooling cavity and the inner passage. The quench aperture may be configured to direct quench air into the inner passage to quench combustion products generated by combusting a mixture of the fuel and the swirled air.

The fuel-air mixer may also include a quench aperture configured to direct quench air into the inner passage to quench combustion products generated by combusting a mixture of the fuel and the swirled air.

The first quench aperture may extend radially through the sidewall to the inner passage.

The first quench aperture may have an elongated cross-sectional geometry.

The first quench aperture may have a regular cross-sectional geometry.

The first quench aperture may be one of a plurality of first quench apertures configured to direct the quench air into the inner passage to quench the combustion products. The first quench apertures may be arranged circumferentially about the axis in a first array.

The fuel-air mixer may also include a plurality of second quench apertures arranged circumferentially about the axis in a second array. The second quench apertures may be configured to direct additional quench air into the inner passage to further quench the combustion products. The second array may be axially offset from the first array along the axis.

One of the first quench apertures may be circumferentially offset from each of the second quench apertures about the axis.

The fuel-air mixer may extend axially along the axis to a mixer end. The inner passage may radially taper towards the axis as the inner passage extends axially along the axis away from the air swirler and towards the mixer end.

The fuel-air mixer may extend axially along the axis to a mixer end. The inner passage may radially expand away the axis as the inner passage extends axially along the axis away from the air swirler and towards the mixer end.

The air swirler may be configured as a radial air swirler.

The air swirler may be configured as an axial air swirler.

The fuel-air mixer may extend axially along the axis between an upstream mixer end and a downstream mixer end. The air swirler may be arranged axially between the fuel nozzle and the downstream mixer end.

The fuel-air mixer may extend axially along the axis between an upstream mixer end and a downstream mixer end. The fuel nozzle may be arranged axially between the air swirler and the downstream mixer end.

The fuel-air mixer may extend axially along the axis between an upstream mixer end and a downstream mixer end. The air swirler may be arranged at the upstream mixer end.

The fuel nozzle may include a plurality of fuel outlets arranged in an array about the axis. A first of the fuel outlets may be configured to inject the fuel in a radial inward direction into the inner passage towards the axis.

The fuel nozzle may include a plurality of fuel outlets arranged in an array about the axis. A first of the fuel outlets may be configured to inject the fuel in an axial direction into the inner passage along the axis.

The fuel-air mixer may also include a plurality of cooling apertures extending through the sidewall. A first of the cooling apertures may be configured to direct cooling air into the inner passage in an axial direction.

The fuel-air mixer may also include a plurality of cooling apertures extending through the sidewall. A first of the cooling apertures may be configured to direct cooling air into the inner passage in a radial direction.

The fuel-air mixer may also include a plurality of cooling apertures extending through the sidewall. A first of the cooling apertures may be configured to direct cooling air into the inner passage towards an outlet from the air swirler into the inner passage.

The fuel-air mixer may also include a shell and a cooling cavity radially between the shell and the sidewall. The shell may extend axially along and circumferentially about the sidewall. The shell may include one or more cooling apertures configured to direct cooling air into the cooling cavity to impinge against the sidewall.

The quench aperture may receive the quench air from the cooling cavity.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
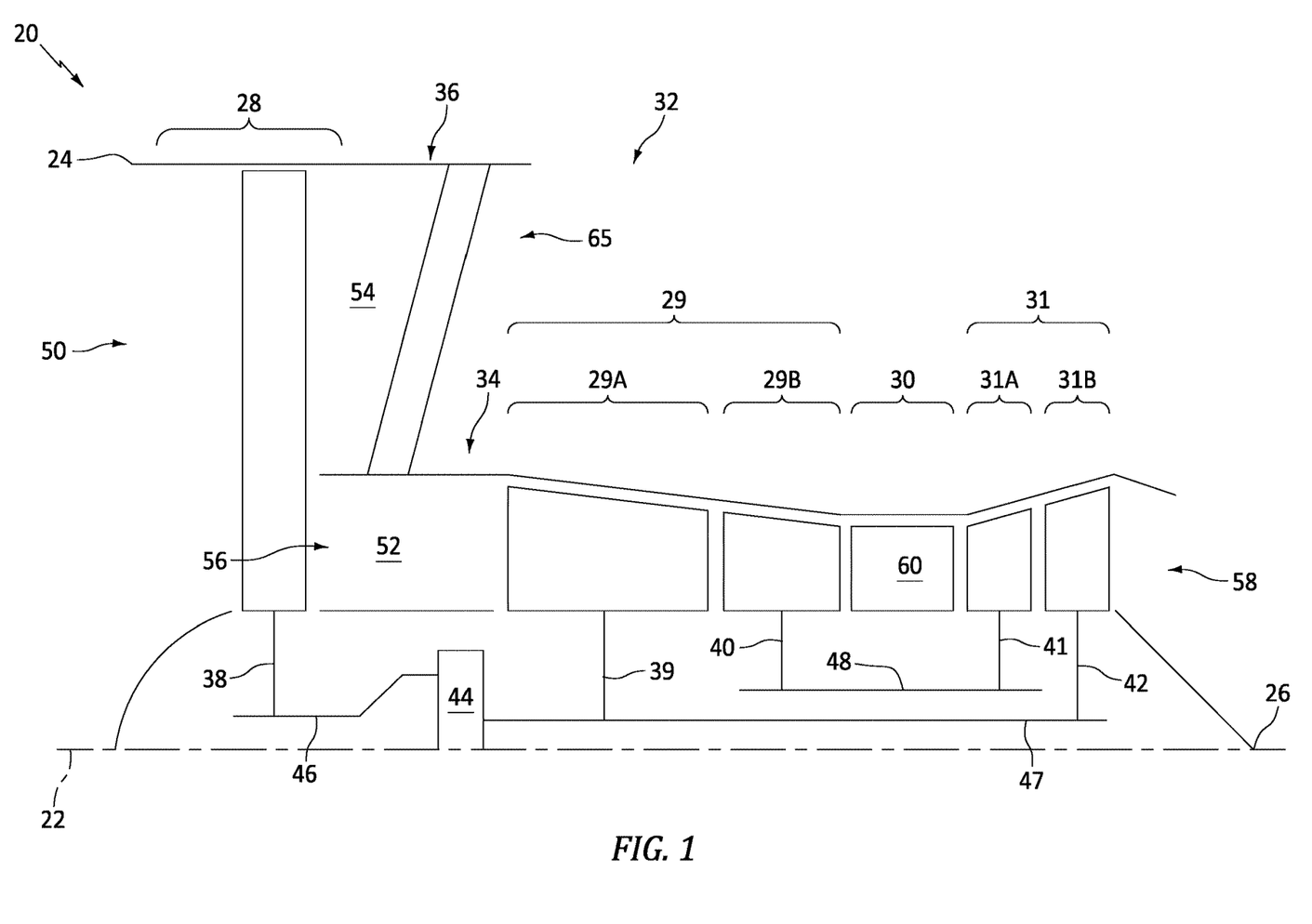
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a combustion zone 60 within the combustor section 30. Fuel is injected into the combustion zone 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 65 from the bypass flowpath 54. The propulsion of the bypass air may account for a majority of thrust generated by the turbine engine 20.

Figure 2:
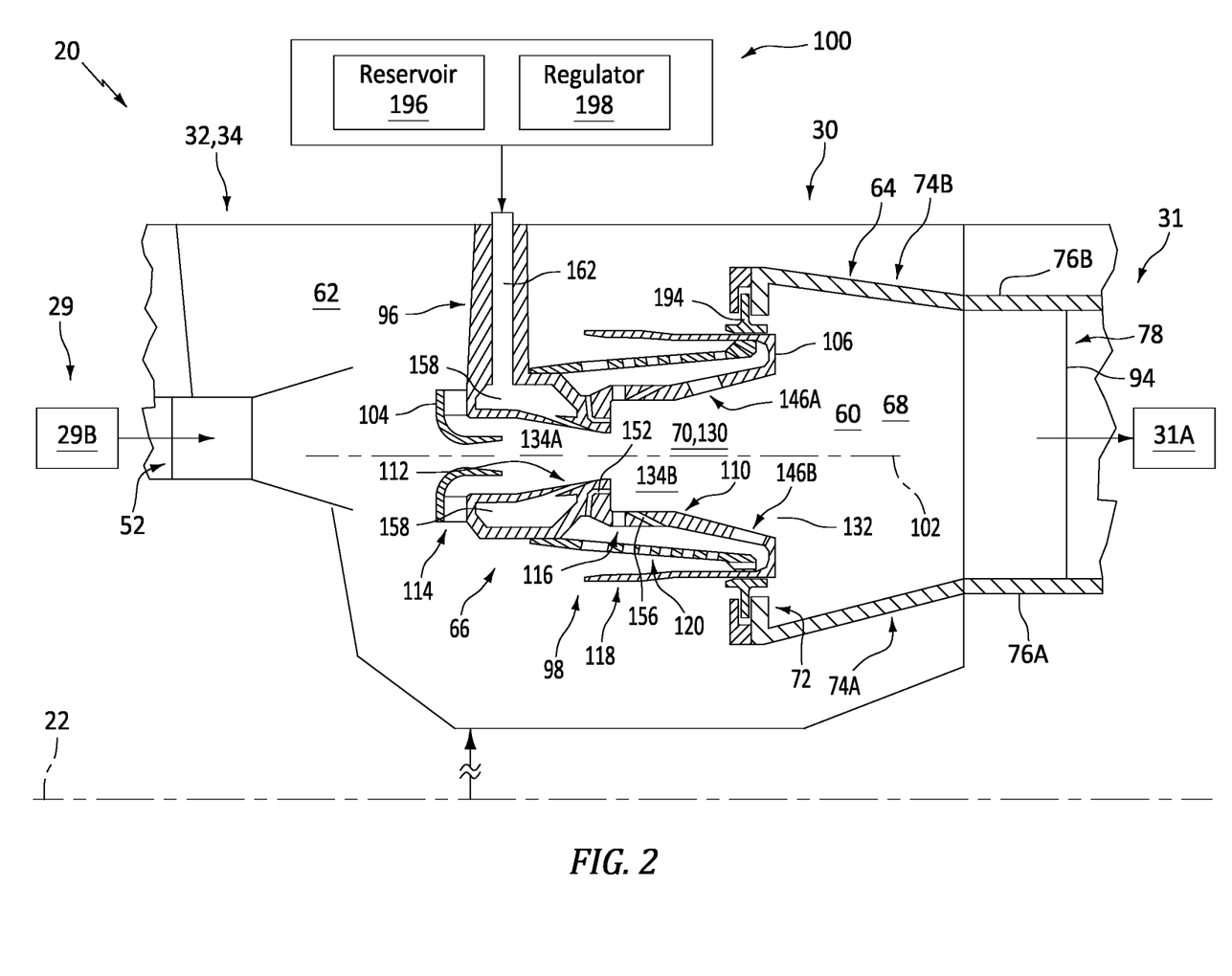
FIG. 2 is a partial schematic illustration of a combustor section between a compressor section and a turbine section.

FIG. 2 illustrates a portion of the combustor section 30 along the core flowpath 52 between the HPC section 29B and the HPT section 31A. This combustor section 30 includes a diffuser plenum 62, a combustor 64 and one or more fuel-air mixers 66 (one visible in FIG. 2). Briefly, the combustor 64 and the fuel-air mixers 66 are disposed within (e.g., surrounded by) the diffuser plenum 62. The diffuser plenum 62 is configured to receive compressed core air from the HPC section 29B for subsequent provision into the combustion zone 60. The combustion zone 60 of FIG. 2 includes a combustion chamber 68 within the combustor 64. This combustion zone 60 may also include an internal volume 70 within the each of the fuel-air mixers 66.

The combustor 64 may be configured as an annular combustor; e.g., an annular floating wall combustor. The combustor 64 of FIGS. 2 and 3, for example, includes an annular combustor bulkhead 72, a tubular inner combustor wall 74A ("inner wall") and a tubular outer combustor wall 74B ("outer wall"). The bulkhead 72 of FIG. 2 extends radially between and to the inner wall 74A and the outer wall 74B. The bulkhead 72 may be connected (e.g., mechanically fastened or otherwise attached) to the inner wall 74A and/or the outer wall 74B. Each combustor wall 74A, 74B (generally referred to as "74") projects axially along the axial centerline 22 out from the bulkhead 72 towards the HPT section 31A. The inner wall 74A of FIG. 2, for example, projects axially to and may be connected to an inner platform 76A of a downstream stator vane array 78 (e.g., a turbine inlet nozzle) in the HPT section 31A. The outer wall 74B of FIG. 2 projects axially to and may be connected to an outer platform 76B of the downstream stator vane array 78. With the arrangement of FIG. 2, the combustion chamber 68 is formed by and extends radially within the combustor 64 between and to the inner wall 74A and the outer wall 74B. The combustion chamber 68 is formed by and extends axially (in an upstream direction along the core flowpath 52) into the combustor 64 from the stator vane array 78 to the bulkhead 72. The combustion chamber 68 also extends within the combustor 64 circumferentially about (e.g., completely around) the axial centerline 22, which may configure the combustion chamber 68 as a full-hoop annulus.

For ease of description, the combustion chamber 68 may be described below as having the above annular configuration. The combustor 64 of the present disclosure, however, is not limited to such an exemplary arrangement. For example, referring to FIG. 4, the combustor 64 may alternatively include/be divided into one or more combustor modules 80; e.g., circumferential sections. Each combustor module 80 may include a circumferential (e.g., arcuate) section of the bulkhead 72, a circumferential (e.g., arcuate) section of the inner wall 74A and a circumferential (e.g., arcuate) section of the outer wall 74B. While the wall sections are described above as sections of a common wall 72, 74A, 74B, each wall section may alternatively be configured as a standalone component from the other line wall sections.

Figure 4:
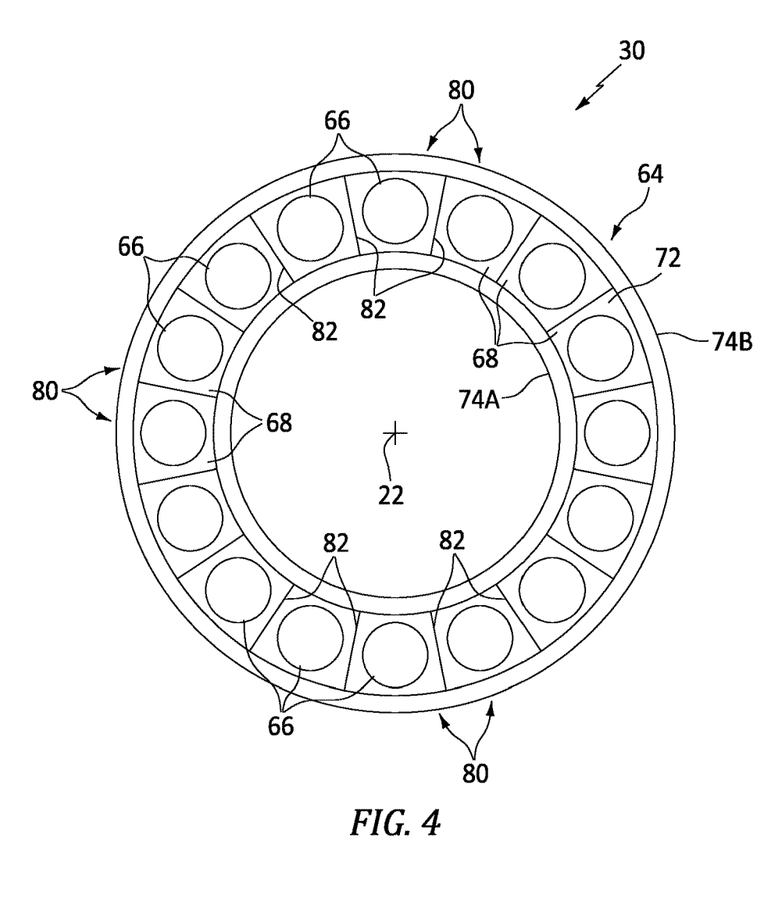
FIG. 4 is a schematic illustration of the combustor section with a modular combustor.

The combustor 64 of FIG. 4 also includes a plurality of dividers 82 arranged circumferentially about the axial centerline 22 in an array. Each of these dividers 82 is configured to circumferentially divide the combustor 64 into the combustor modules 80. Each divider 82 of FIG. 4, in particular, is disposed at a circumferential interface and/or joint between a respective circumferentially neighboring (e.g., adjacent) pair of the combustor modules 80. Each divider 82 may be formed by a single divider wall such that each circumferentially neighboring pair of the combustor modules 80 shares a common divider wall. Alternatively, each divider 82 may be formed by a pair of parallel divider walls such that each circumferentially neighboring pair of the combustor modules 80 has its own divider wall at a respective divider location. With either arrangement, each combustor module 80 is configured with its own arcuate combustion chamber 68. This combustion chamber 68 may extend axially and radially as discussed above. However, instead of extending completely circumferentially around the axial centerline 22, each arcuate combustion chamber 68 extends circumferentially partially about the axial centerline 22 within a respective combustor module 80 between its dividers 82. With such an arrangement, the core flowpath 52 is divided into a plurality of parallel legs within the combustor 64 until reaching, for example, an upstream end or a downstream end of the stator vane array 78.

Figure 5:
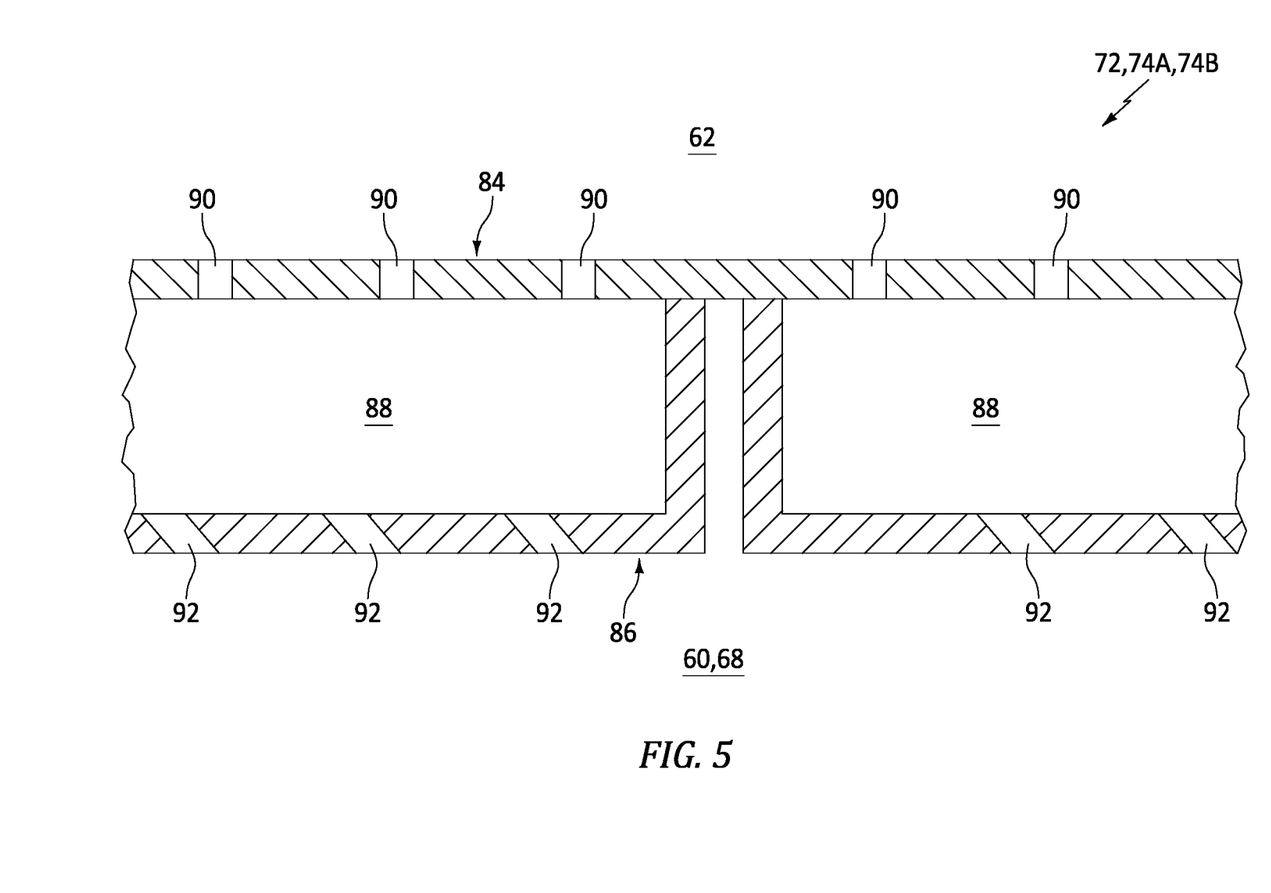
FIG. 5 is a partial sectional illustration of a combustor wall.

Referring to FIG. 5, any one or more or all of the walls 72, 74A and/or 74B may each be configured as a multi-walled structure; e.g., a hollow, dual-walled structure. For example, each wall 72, 74A, 74B of FIG. 5 includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 5 is fluidly coupled with the diffuser plenum 62 through one or more cooling apertures 90 in the shell 84; e.g., impingement apertures. Each cooling cavity 88 of FIG. 5 is fluidly coupled with the combustion chamber 68 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 72, 74A and/or 74B of FIG. 2 may each alternatively be configured as a single-walled structure. The shell 84 (see FIG. 5) for example, may be omitted and the heat shield 86 may form a single walled liner/wall. However, for ease of description, each wall 72, 74A, 74B may each be described below as the hollow, dual-walled structure.

The stator vane array 78 or FIG. 2 includes the inner platform 76A, the outer platform 76B and a plurality of stator vanes 94 (one visible in FIG. 2). The stator vanes 94 are arranged circumferentially about the axial centerline 22 in an array; e.g., a circular array. Each of these stator vanes 94 extends radially across the core flowpath 52 between and to the inner platform 76A and the outer platform 76B. Each of the stator vanes 94 may also be connected to the inner platform 76A and/or the outer platform 76B. The stator vane array 78 and its stator vanes 94 are configured to turn and/or otherwise condition the combustion products exiting the combustion zone 60 for interaction with a first stage of the HPT rotor 41 (see FIG. 1).

Figure 3:
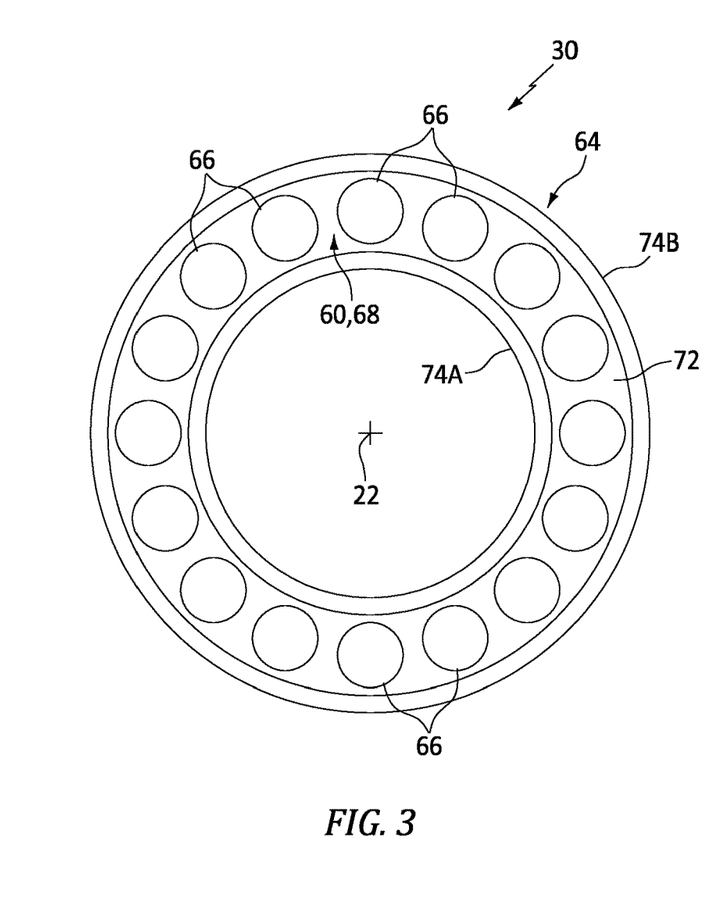
FIG. 3 is a schematic illustration of the combustor section with an annular combustor.

Referring to FIGS. 3 and 4, the fuel-air mixers 66 are arranged circumferentially about the axial centerline 22 in an array; e.g., a circular array. Within this array, the fuel-air mixers 66 may be equally spaced by a common circumferential inter-mixer distance. The present disclosure, however, is not limited to such an exemplary equidistance fuel-air mixer arrangement.

Figure 6:
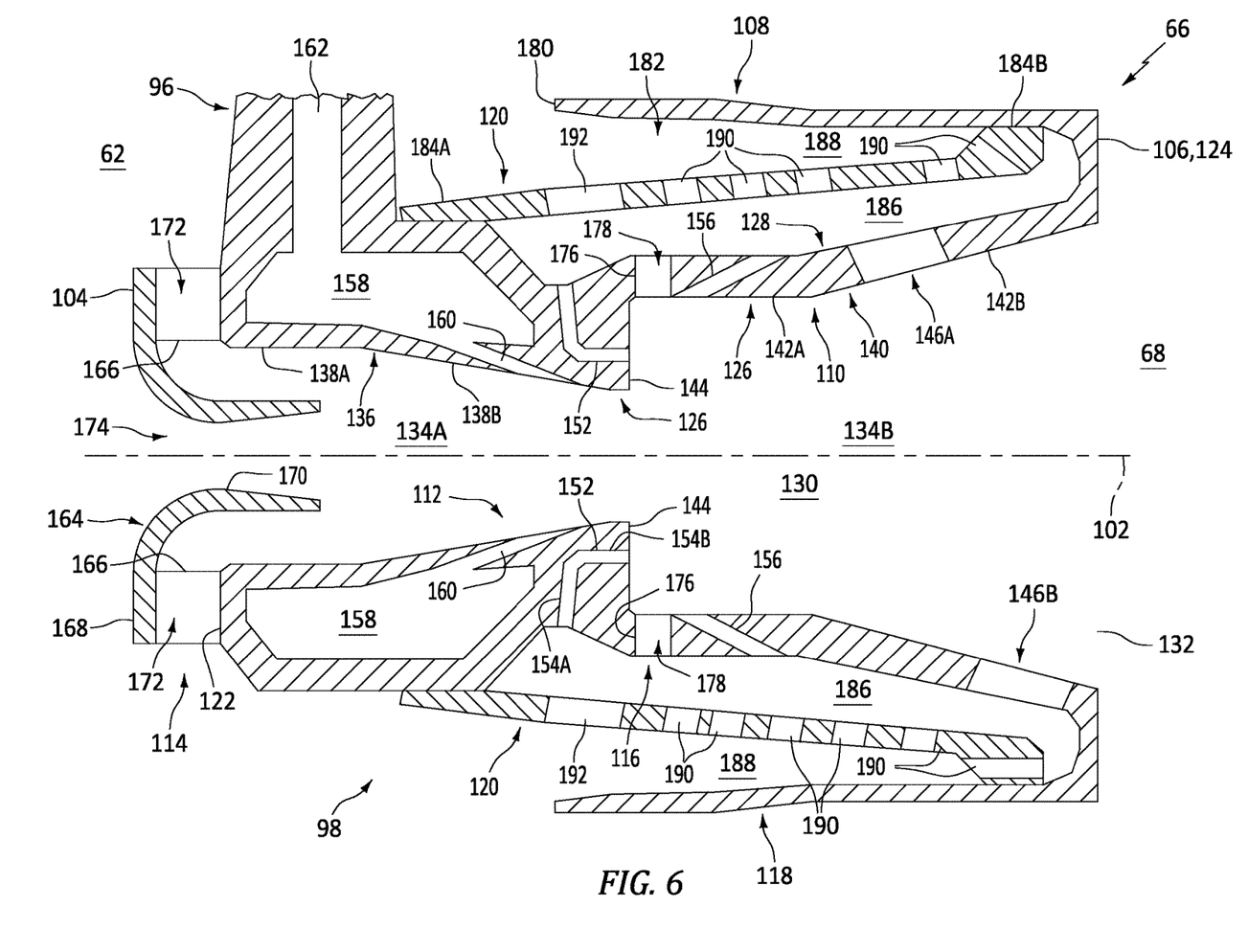
FIG. 6 is a partial sectional illustration of a fuel-air mixer.

Each fuel-air mixer 66 of FIG. 2 includes a mixer stem 96 and a tubular mixer body 98. The mixer stem 96 is configured to support and route fuel from a fuel source 100 to the mixer body 98. Referring to FIG. 6, the mixer body 98 is connected to and may be cantilevered from the mixer stem 96. The mixer body 98 of FIG. 6 extends axially along a centerline axis 102 of the mixer body 98 from an upstream end 104 of the fuel-air mixer 66 and its mixer body 98 to a downstream end 106 of the fuel-air mixer 66 and its mixer body 98. The mixer body 98 projects radially out to an outer side 108 of the mixer body 98. The mixer body 98 of FIG. 6 includes a tubular mixer sidewall 110, a fuel nozzle 112 and one or more air swirlers 114 and 116. The mixer body 98 may also include a mixer mount 118 and/or a mixer shell 120.

The mixer sidewall 110 of the FIG. 6 extends axially along the axis 102 between and to an upstream end 122 of the mixer sidewall 110 and a downstream end 124 of the mixer sidewall 110, which axis 102 may also be a centerline axis of the mixer sidewall 110. The sidewall upstream end 122 of FIG. 6 is axially offset (e.g., recessed from) the mixer upstream end 104. The sidewall downstream end 124 of FIG. 6 is axially aligned with the mixer downstream end 106. The mixer sidewall 110 extends radially between and to an inner side 126 of the mixer sidewall 110 and an outer side 128 of the mixer sidewall 110. The mixer sidewall 110 extends circumferentially about (e.g., completely around) the axis 102 thereby forming an inner passage 130 (e.g., a center mixer passage) within the fuel-air mixer 66 and its mixer body 98.

The inner passage 130 extends axially along the axis 102 within the mixer body 98, which axis 102 may also be a centerline axis of the inner passage 130. The inner passage 130 of FIG. 6, for example, projects axially through an interior of the mixer sidewall 110 (e.g., out of the fuel-air mixer 66 and its mixer body 98) from the sidewall upstream end 122 to an outlet orifice 132 from the inner passage 130 at the sidewall downstream end 124/the mixer downstream end 106. Briefly, referring to FIG. 2, this passage outlet orifice 132 fluidly couples the inner passage 130 to the combustion chamber 68. Referring again to FIG. 6, the inner passage 130 may include one or more passage segments 134A and 134B (generally referred to as "134") along the axis 102.

The upstream passage segment 134A extends axially within the mixer body 98 from the sidewall upstream end 122 to the downstream passage segment 134B. The upstream passage segment 134A projects radially out from the axis 102 to a tubular inner first surface 136 of the mixer body 98 and its mixer sidewall 110. An upstream portion 138A of the first surface 136 may be provided with a uniform width (e.g., constant diameter) along the axis 102. A downstream portion 138B of the first surface 136 may be provided with a variable width (e.g., changing diameter) along the axis 102. With this arrangement, the upstream passage segment 134A may (e.g., continuously) radially taper inward towards the axis 102 as the inner passage 130 and its upstream passage segment 134A extend axially along the axis 102 away from the mixer upstream end 104 (e.g., and the upstream air swirler 114) and towards the mixer downstream end 106 (e.g., and the downstream air swirler 116); e.g., from the upstream portion 138A of the first surface 136 to or about the downstream passage segment 134B.

The downstream passage segment 134B extends axially within the mixer body 98 from the upstream passage segment 134A to passage outlet orifice 132. The downstream passage segment 134B projects radially out from the axis 102 to a tubular inner second surface 140 of the mixer body 98 and its mixer sidewall 110. An upstream portion 142A of the second surface 140 may be provided with a uniform width (e.g., constant diameter) along the axis 102. A downstream portion 142B of the second surface 140 may be provided with a variable width (e.g., changing diameter) along the axis 102. With this arrangement, the downstream passage segment 134B may (e.g., continuously) radially expand (e.g., flare) outward away from the axis 102 as the inner passage 130 and its downstream passage segment 134B extend axially along the axis 102 away from the mixer upstream end 104 (e.g., and the mixer elements) and towards (e.g., to) the mixer downstream end 106; e.g., from the upstream portion 142A of the second surface 140 to or about the passage outlet orifice 132.

Each of the passage segments 134A, 134B may be configured as an inner bore of the mixer sidewall 110. However, the downstream passage segment 134B of FIG. 6 may also be a counterbore to the upstream passage segment 134A. An annular shelf 144, for example, projects radially outward from the first surface 136 to the second surface 140 at an intersection between the passage segments 134A and 134B. This shelf 144 may be perpendicular to the axis 102; however, the present disclosure is not limited thereto.

Figure 7:
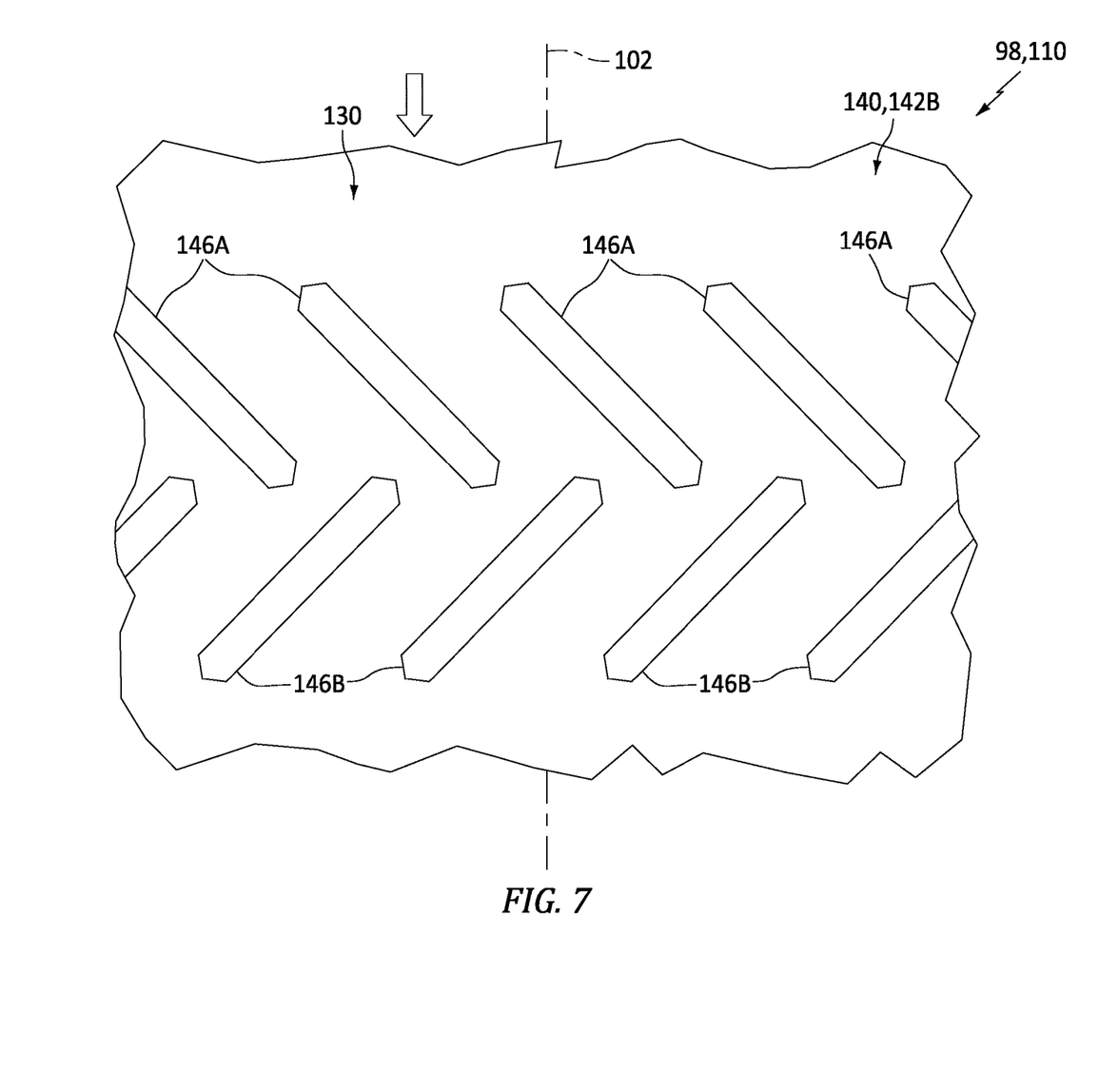
FIG. 7 is a partial illustration of the fuel-air mixer with quench apertures.

The mixer body 98 and its mixer sidewall 110 of FIG. 6 may be configured with one or more quench apertures 146A and 146B (generally referred to as "146"); see also FIG. 7. The upstream quench apertures 146A are arranged circumferentially about the axis 102 in an upstream array; e.g., a circular array. The downstream quench apertures 146B are arranged circumferentially about the axis 102 in a downstream array (e.g., a circular array), where the downstream array and its downstream quench apertures 146B are arranged downstream of the upstream array and its upstream quench apertures 146A along the inner passage 130. Within each of the arrays, the quench apertures 146 may be equally spaced by a common circumferential inter-aperture distance. The present disclosure, however, is not limited to such an exemplary equidistance quench aperture arrangement.

Referring to FIG. 7, the upstream quench apertures 146A may be circumferentially offset from the downstream quench apertures 146B about the axis 102. A center of one or more or all of the upstream quench apertures 146A, for example, may be circumferentially offset from a center of each downstream quench aperture 146B about the axis 102. Similarly, a center of one or more or all of the downstream quench apertures 146B may be circumferentially offset from a center of each upstream quench aperture 146A about the axis 102. Depending upon spacing between the quench apertures 146 within the arrays, each upstream quench aperture 146A may (or may not) partially circumferentially overlap one or more of the downstream quench apertures 146B.

Referring to FIG. 6, each quench aperture 146 extends radially through the mixer sidewall 110 from an inlet orifice into the respective quench aperture 146 to an outlet orifice from the respective quench aperture 146. The inlet orifice is disposed at the sidewall outer side 128. The outlet orifice is disposed at the sidewall inner side 126, for example in the second surface 140 and towards the mixer downstream end 106 and/or the passage outlet orifice 132.

Figure 8A:
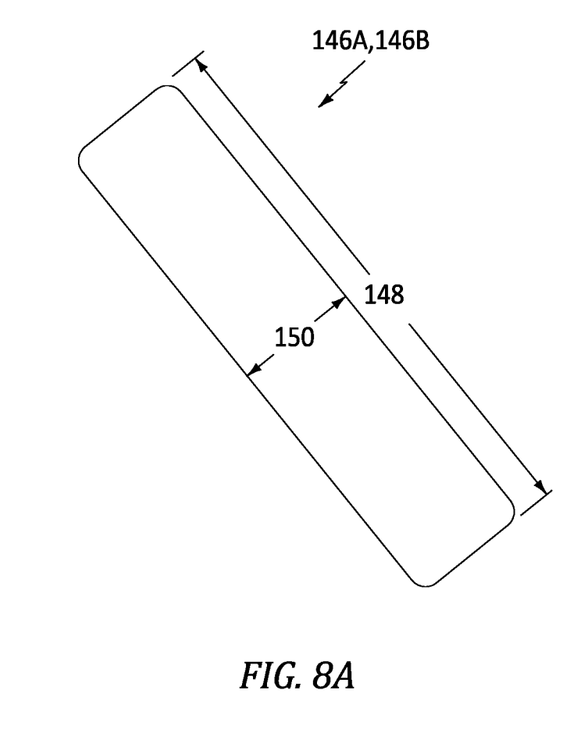
FIGS. 8A and 8B are schematic illustrations of various quench aperture geometries.
Figure 8B:
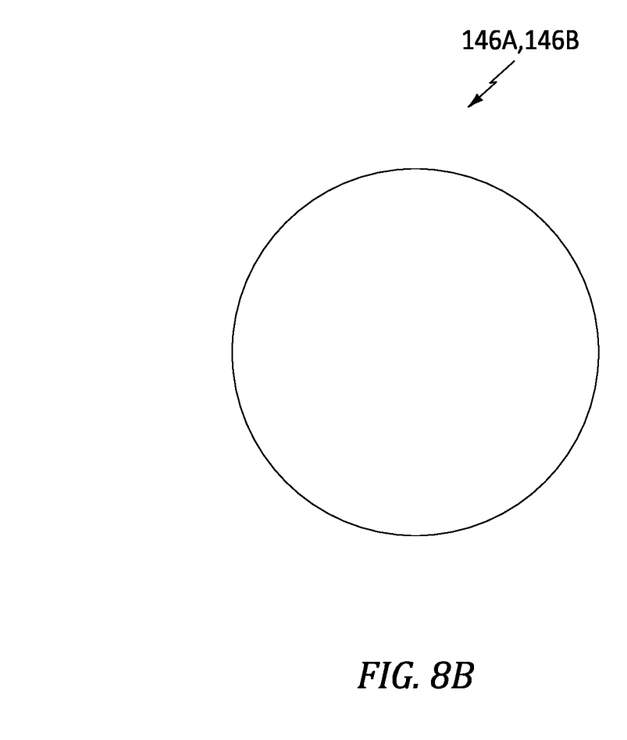

Referring to FIGS. 8A and 8B, each quench aperture 146 has a cross-sectional geometry; e.g., shape and size. The cross-sectional geometry of each quench aperture 146 in the same array may be uniform; e.g., the same. Alternatively, the cross-sectional geometry of one or more of the quench apertures 146A, 146B may be different (e.g., in shape and/or size) than the cross-sectional geometry of one or more other quench apertures 146A, 146B in the same array. Furthermore, the cross-sectional geometry of all the quench apertures 146A and 146B may be uniform. Alternatively, the cross-sectional geometry of one or more or all of the upstream quench apertures 146A may be different (e.g., in shape and/or size) than the cross-sectional geometry of one or more or all of the downstream quench apertures 146B.

In some embodiments, referring to FIG. 8A (see also FIG. 7), one or more or all of the quench apertures 146A and/or 146B may each have an elongated cross-sectional geometry when viewed, for example, in a reference plane perpendicular to a centerline of the respective quench aperture 146. This elongated cross-sectional geometry may have a major axis dimension 148 that is greater than a minor axis 150 dimension. The elongated cross-sectional geometry may have a slot shape, an oval shape, a rectangular shape or any other elongated curved and/or polygonal shape.

In some embodiments, referring to FIG. 8B, one or more or all of the quench apertures 146A and/or 146B may each have a regular cross-sectional geometry (e.g., a non-elongated cross-sectional geometry) when viewed, for example, in a reference plane perpendicular to a centerline of the respective quench aperture 146. Here, a "regular" shape may describe a shape with equal length sides that are symmetrically placed about a center of the shape. The regular cross-sectional geometry, for example, may have a circular shape, a square shape or any other regular curved and/or polygonal shape.

The mixer body 98 and its mixer sidewall 110 of FIG. 6 may be configured with one or more upstream sidewall cooling apertures 152. These upstream sidewall cooling apertures 152 are arranged circumferentially about the axis 102 in an array (e.g., a circular array). This array of upstream sidewall cooling apertures 152 may be located in the mixer sidewall 110 axially between the fuel nozzle 112 and the downstream air swirler 116.

Each upstream sidewall cooling aperture 152 extends through the mixer sidewall 110 and may be aimed in a direction (e.g., axially) towards the downstream air swirler 116 and/or the passage outlet orifice 132. An upstream portion 154A of each upstream sidewall cooling aperture 152 of FIG. 6, for example, projects radially into the mixer sidewall 110 from an inlet orifice into the respective upstream sidewall cooling aperture 152. This inlet orifice is disposed at the sidewall outer side 128. A downstream portion 154B of each upstream sidewall cooling aperture 152 of FIG. 6 projects axially into the mixer sidewall 110 from an outlet orifice from the respective upstream sidewall cooling aperture 152. This outlet orifice is disposed at the sidewall inner side 126 and, more particularly, in the shelf 144. With this arrangement, each upstream sidewall cooling aperture 152 may have an L-shaped sectional geometry when viewed, for example, in a reference plane parallel with (e.g., including) the axis 102.

The upstream sidwall cooling apertures 152 are configured to air cool a portion of the mixer sidewall 110 between the fuel nozzle 112 and the downstream air swirler 116. The upstream sidewall cooling apertures 152 may also direct cooling air into the inner passage 130 in an axial direction towards an outlet orifice from the downstream air swirler 116.

The mixer body 98 and its mixer sidewall 110 of FIG. 6 may also or alternatively be configured with one or more downstream sidewall cooling apertures 156. These downstream sidewall cooling apertures 156 are arranged circumferentially about the axis 102 in an array (e.g., a circular array). This array of downstream sidewall cooling apertures 156 may be located in the mixer sidewall 110 axially between the downstream air swirler 116 and the passage outlet orifice 132.

Each downstream sidewall cooling aperture 156 extends through the mixer sidewall 110 and may be aimed in a direction (e.g., axially) towards the downstream air swirler 116 and/or away from the passage outlet orifice 132. Each downstream sidewall cooling aperture 156 of FIG. 6, for example, projects axially and/or radially (e.g., diagonally) through the mixer sidewall 110 from an inlet orifice into the respective downstream sidewall cooling aperture 156 to an outlet orifice from the respective downstream sidewall cooling aperture 156. The inlet orifice is disposed at the sidewall outer side 128. The outlet orifice is disposed at the sidewall inner side 126 and, more particularly, in the upstream portion 142A of the second surface 140.

The downstream sidewall cooling apertures 156 are configured to air cool a portion of the mixer sidewall 110 between the downstream air swirler 116 and the quench apertures 146A and/or 146B. The downstream sidewall cooling apertures 156 may also direct cooling air into the inner passage 130 in an axial and/or radial direction (e.g., a canted direction) towards the outlet orifice from the downstream air swirler 116.

The fuel nozzle 112 may be integrated with (e.g., formed as a part of, included in a common structure with) the mixer body 98. The fuel nozzle 112 of FIG. 6, for example, may be a micro-circuit with a fuel plenum 158 and one or more fuel nozzle outlets 160.

The fuel plenum 158 may be embedded within the mixer sidewall 110. The fuel plenum 158 of FIG. 6, for example, is disposed/formed within the mixer sidewall 110 between the sidewall inner side 126 and the sidewall outer side 128. This fuel plenum 158 is axially aligned with (e.g., axially overlaps, overlapped by) the upstream passage segment 134A, the first surface 136 and the mixer stem 96. The fuel plenum 158 extends axially along the axis 102 within the mixer body 98 and its mixer sidewall 110 to the fuel nozzle outlets 160. The fuel plenum 158 extends radially within the mixer body 98 and its mixer sidewall 110 between a fuel supply passage 162 in the mixer stem 96 and the fuel nozzle outlets 160. The fuel plenum 158 extends circumferentially about (e.g., completely around) the axis 102 within the mixer body 98 and its mixer sidewall 110, for example circumscribing the upstream passage segment 134A.

The fuel nozzle 112 of FIG. 6 and its fuel plenum 158 may be positioned axially along the axis 102 between the upstream air swirler 114 and the downstream air swirler 116. The fuel nozzle 112 and its fuel plenum 158 may be positioned axially along the axis 102 between the upstream air swirler 114 and the mixer downstream end 106. The fuel nozzle 112 and its fuel plenum 158 may be positioned axially along the axis 102 between the mixer upstream end 104 and the downstream air swirler 116.

The fuel nozzle outlets 160 fluidly couple the fuel plenum 158 to the inner passage 130. The fuel nozzle outlets 160 may be arranged circumferentially about the axis 102 in an array (e.g., a circular array) at or near the intersection between the upstream passage segment 134A and the downstream passage segment 134B; e.g., along the inner passage 130 slightly upstream of the shelf 144. Each fuel nozzle outlet 160 of FIG. 6 projects radially out from the fuel plenum 158 (in a radial inward direction) to a respective outlet orifice in the first surface 136 and its downstream portion 138B. Each fuel nozzle outlet 160 is configured to inject fuel received from the fuel plenum 158 into the inner passage 130 in a radial inward direction towards the axis 102. Here, the fuel is also injected from the fuel nozzle outlet 160 in an axial downstream direction; e.g., axially towards the passage outlet orifice 132. A radial component of a trajectory of the injected fuel may be less than an axial component of the injected fuel trajectory. Of course, in other embodiments, the axial component of the injected fuel trajectory may be equal to or less than the radial component of the injected fuel trajectory. In still other embodiments, the injected fuel trajectory may be perpendicular to the axis 102.

The upstream air swirler 114 may be arranged at the mixer upstream end 104. This upstream air swirler 114 may be integrated with the mixer body 98, or alternatively attached to the mixer body 98. The upstream air swirler 114 of FIG. 6, for example, includes a swirler guide 164 and one or more swirler vanes 166.

The swirler guide 164 extends circumferentially about (e.g., completely around) the axis 102. The swirler guide 164 includes an annular outer segment 168 and a tubular inner segment 170. The outer segment 168 is disposed at the mixer upstream end 104 and projects radially outward from the inner segment 170. The inner segment 170 projects axially into (or extends axially within) the inner passage 130 at the sidewall upstream end 122. With this arrangement, the swirler guide 164 forms an annular upstream swirler passage 172 with the mixer sidewall 110. An upstream portion of the upstream swirler passage 172 is formed by and extends axially between the outer segment 168 and the sidewall upstream end 122. A downstream portion of the upstream swirler passage 172 is formed by and extends radially between the inner segment 170 and the first surface 136. In addition, an inner bore 174 through the swirler guide 164 may form a center inlet into the inner passage 130 from the diffuser plenum 62 (see also FIG. 2).

The swirler vanes 166 are arranged circumferentially about the axis 102 in an array; e.g., a circular array. Each of these swirler vanes 166 is connected to and extends axially between the swirler guide 164 and its outer segment 168 and the mixer sidewall 110. Each of the swirler vanes 166 thereby axially crosses the upstream swirler passage 172. The swirler vanes 166 are arranged to impart swirl onto the compressed core air directed through the upstream swirler passage 172 from the diffuser plenum 62 into the inner passage 130. The swirl may be imparted in a clockwise or counterclockwise direction about the axis 102.

The downstream air swirler 116 may be arranged at an intermediate location (e.g., at or about an axial center) between the mixer upstream end 104 and the mixer downstream end 106. This downstream air swirler 116 may be integrated with the mixer body 98. The downstream air swirler 116 of FIG. 6, for example, includes one or more swirler vanes 176 arranged within a downstream swirler passage 178. This downstream swirler passage 178 may be an annular passage, and extends radially through the mixer sidewall 110 from an inlet orifice into the downstream swirler passage 178 to an outlet orifice from the downstream swirler passage 178. The inlet orifice is disposed at the sidewall outer side 128. The outlet orifice is disposed at the sidewall inner side 126, for example in the second surface 140 and axially adjacent (or proximate) the shelf 144.

The swirler vanes 176 are arranged circumferentially about the axis 102 in an array; e.g., a circular array. Each of these swirler vanes 176 is connected to and extends axially between axially opposing portions of the mixer sidewall 110; e.g., between opposing axial sidewalls forming the downstream swirler passage 178. Each of the swirler vanes 176 thereby axially crosses the downstream swirler passage 178. The swirler vanes 176 are arranged to impart swirl onto the compressed core air directed through the downstream swirler passage 178 from the diffuser plenum 62 into the inner passage 130. The swirl may be imparted in a clockwise or counterclockwise direction about the axis 102, which may be the same direction as the swirl imparted by the upstream air swirler 114.

Figure 9:
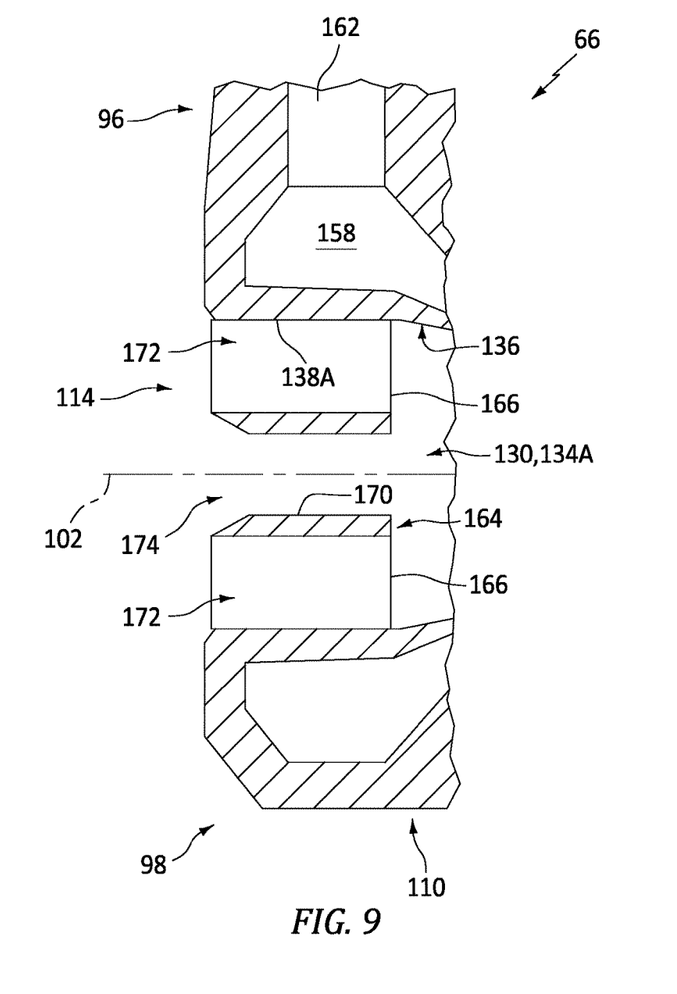
FIG. 9 is a partial sectional illustration of the fuel-air mixer with an axial air swirler.

Both of the air swirlers 114 and 116 are described above as radial air swirlers. In other embodiments, however, it is contemplated that the fuel-air mixer 66 may also or alternatively include one or more axial air swirlers. For example, referring to FIG. 9 the swirler guide 164 of the upstream air swirler 114 may be configured without the outer segment 168 (see FIG. 6). With such an arrangement, the swirler vanes 166 may be connected to and extend radially between the swirler guide 164 and the mixer sidewall 110. Here, the swirler vanes 166 are also circumscribed by the mixer sidewall 110 and/or also disposed within the inner passage 130 at the mixer upstream end 104.

Referring to FIG. 6, the mixer mount 118 may be connected to the mixer sidewall 110 at the mixer downstream end 106. This mixer mount 118 projects axially along the axis 102 from the mixer downstream end 106, along the mixer sidewall 110, to a distal end 180 which is axially spaced from the mixer stem 96. The mixer mount 118 is spaced radially outboard from the mixer sidewall 110. The mixer mount 118 of FIG. 6 extends circumferentially about (e.g., completely around, circumscribes) the mixer sidewall 110. With this arrangement, an annular volume 182 is formed radially between the mixer sidewall 110 and the mixer mount 118.

The mixer shell 120 extends axially along the mixer sidewall 110. More particularly, the mixer shell 120 projects axially out from the mixer sidewall 110 to the mixer mount 118. An upstream end portion 184A of the mixer shell 120 of FIG. 6 is connected to the mixer sidewall 110 at the sidewall outer side 128. This upstream end portion 184A of the mixer shell 120 may be disposed axially adjacent the mixer stem 96. A downstream end portion 184B of the mixer shell 120 of FIG. 6 is connected to the mixer mount 118 at an inner side of the mixer mount 118 that radially faces (e.g., is opposite) the mixer sidewall 110. This downstream end portion 184B of the mixer shell 120 may be disposed at or near the mixer downstream end 106. The mixer shell 120 extends circumferentially about (e.g., completely around) the axis 102, and may thereby circumscribe the mixer sidewall 110. The mixer shell 120 is spaced radially outboard of the mixer sidewall 110. The mixer shell 120 is spaced radially inboard of the mixer mount 118. With this arrangement, the mixer shell 120 may divide the annular volume 182 between the mixer sidewall 110 and the mixer mount 118 into an annular inner region and an annular outer region. The inner region may form a cooling cavity 186 (e.g., an impingement cavity) between the mixer shell 120 and the mixer sidewall 110. The outer region may form a feed cavity 188.

The mixer shell 120 of FIG. 6 is configured with one or more cooling apertures 190; e.g., impingement apertures. These shell cooling apertures 190 are arranged axially along and/or circumferentially about the mixer shell 120 and the axis 102. Each of these shell cooling apertures 190 extends radially and/or axially through the mixer shell 120 between an inlet orifice to the respective shell cooling aperture 190 and an outlet orifice from the respective shell cooling aperture 190. The inlet orifice is disposed at an outer side of the mixer shell 120, and the outlet orifice is disposed at an inner side of the mixer shell 120. With this arrangement, the shell cooling apertures 190 fluidly couple the feed cavity 188 to the cooling cavity 186. Furthermore, one, some or all of the shell cooling apertures 190 may be configured to direct cooling air into the cooling cavity 186 to impinge against the mixer sidewall 110 and its sidewall outer side 128 to cool the mixer sidewall 110.

The mixer shell 120 of FIG. 6 is also configured with one or more feed apertures 192. These feed apertures 192 are arranged circumferentially about the axis 102 in an array; e.g., a circular array. This array of feed apertures 192 may be axially aligned with or near the downstream air swirler 116. The feed apertures 192 of FIG. 6, for example, are located axially adjacent and upstream of the downstream air swirler 116 along the axis 102. Each of these feed apertures 192 extends radially and/or axially through the mixer shell 120 between an inlet orifice to the respective feed aperture 192 and an outlet orifice from the respective feed aperture 192. The inlet orifice is disposed at the shell outer side, and the outlet orifice is disposed at the shell inner side. With this arrangement, the feed aperture 192 further fluidly couple the feed cavity 188 to the cooling cavity 186.

The feed apertures 192 may be configured to supplement air flow into the cooling cavity 186 in order to provide adequate air supply for the downstream air swirler 116 and/or the quench apertures 146. Of course, in other embodiments, the shell cooling apertures 190 may alternatively provide enough airflow and the feed apertures 192 may be omitted. In still other embodiments, the shell cooling apertures 190 may be omitted where impingement cooling is not required.

Referring to FIG. 2, each fuel-air mixer 66 is mated with the combustor 64. More particularly, each fuel-air mixer 66 and its mixer body 98 is mated with the bulkhead 72. The mixer body 98 of FIG. 2, for example, projects axially along the axis 102 through (or partially into) an aperture in the bulkhead 72. Each fuel-air mixer 66 and its mixer body 98 may be attached to the combustor 64 and its bulkhead 72 using a guide plate 194. This guide plate 194 circumscribes the mixer mount 118. The guide plate 194 of FIG. 2 radially engages (e.g., contacts) the mixer mount 118, and may be configured to move (e.g., translate, slide) axially along the mixer mount 118. The guide plate 194 may also be moveably coupled to the combustor 64 and its bulkhead 72. The guide plate 194 of FIG. 2, for example, may be retained (e.g., within a slot) to facilitate radial movement of the guide plate 194 relative to the bulkhead 72. The present disclosure, however, is not limited to such an exemplary attachment technique.

During operation of the combustor section 30 of FIG. 2, each fuel-air mixer 66 receives the fuel from the fuel source 100 and compressed core air from the diffuser plenum 62. At each fuel-air mixer 66, the fuel nozzle 112 injects the fuel into the inner passage 130 and its upstream passage segment 134A. The upstream air swirler 114 directs the compressed core air into the inner passage 130 and its upstream passage segment 134A to mix with the fuel. This fuel-air mixture flows out of the upstream passage segment 134A into the downstream passage segment 134B. The downstream air swirler 116 directs additional compressed core air into the inner passage 130 and its downstream passage segment 134B to further mix with the fuel-air mixture from the upstream passage segment 134A. An ignitor (not shown) may ignite the fuel-air mixture within the downstream passage segment 134B; e.g., the mixer internal volume 70 of the combustion zone 60. The quench apertures 146 direct additional compressed core air into the inner passage 130 and its downstream passage segment 134B to quench (e.g., stoichiometrically lean) the combustion products (e.g., the ignited fuel-air mixture) generated by the ignition of the fuel-air mixture. These quenched combustion products then flow out of the passage outlet orifice 132 into the combustion chamber 68 for further combustion. Thus, the combustion process may initiate within the inner passage 130 of the fuel-air mixer 66 and continue (e.g., substantially finish) within the combustion chamber 68 before flowing into the turbine section 31 and its HPT section 31A through the stator vane array 78.

With the arrangement of FIG. 2, a Rich-Quench-Lean (RQL) combustion process may be shifted upstream into the fuel-air mixer 66. This may facilitate more targeted/tailored quenching of the combustion products, which may be particularly useful with use of alternative fuels such as, but not limited to, hydrogen ($H_2$) gas. By shifting the RQL combustion process further upstream into the fuel-air mixer 66, a time the combustion products are at high temperature may be reduced, which may reduce nitric oxide (NOx) production. Furthermore, by shifting the RQL combustion process further upstream into the fuel-air mixer 66, an overall length of the combustor 64 and its combustion chamber 68 may be reduced. The combustor 64 of FIG. 2, for example, has an axial length that equal to or less than an axial length of the fuel-air mixers 66. Of course, in other embodiments, the combustor length may alternatively be greater than the mixer length. In still other embodiments, the mixer length may be increased such that all of the combustion process occurs within the fuel-air mixers 66 and the combustor 64 may be omitted.

To accommodate the exposure of the fuel-air mixers 66 to the combustion process, each fuel-air mixer 66 of FIG. 6 is cooled via the shell cooling apertures 190 and the mixer cooling apertures 152 and 156. At each fuel-air mixer 66, air from the diffuser plenum 62 is directed into the cooling cavity 186 through the shell cooling apertures 190 to impingement cool the mixer sidewall 110. At least some of this cooling air may then pass through the mixer cooling apertures 152 and 156 to provide further cooling for the mixer sidewall 110. The cooling air may then be exhausted into the inner passage 130 and mixed with the air swirled by the downstream air swirler 116.

The fuel source 100 of FIG. 2 includes a fuel reservoir 196 and/or a fuel flow regulator 198; e.g., a valve and/or a pump. The fuel reservoir 196 is configured to store the fuel before, during and/or after turbine engine operation. The fuel reservoir 196, for example, may be configured as or otherwise include a tank, a cylinder, a pressure vessel, a bladder or any other type of fuel storage container. The fuel flow regulator 198 is configured to direct and/or meter a flow of the fuel from the fuel reservoir 196 to one or more or all of the fuel-air mixers 66.

The fuel delivered by the fuel source 100 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel source 100, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel source 100 may be configured as a multi-fuel system operable to deliver, individually or in combination, multiple different fuels (e.g., a non-hydrocarbon fuel and a hydrocarbon fuel, etc.) for combustion within the combustion zone 60. The turbine engine 20 of FIG. 1 may thereby be configured as a multi-fuel turbine engine; e.g., a dual-fuel turbine engine. However, for ease of description, the fuel delivered by the fuel source 100 may be described as the non-hydrocarbon fuel; e.g., the hydrogen fuel.

While the fuel-air mixers 66 are described above as facilitating combustion/ignition of the fuel-air mixture within the inner passages 130, it is contemplated this combustion/ignition of the fuel air mixture may alternatively be perform downstream of the fuel-air mixers 66. Furthermore, it is contemplated the foregoing impingement cooling may be utilized in various other fuel-air mixer designs to cool those mixers.

In some embodiments, each fuel-air mixer 66 or at least its mixer body 98 may be formed as a monolithic body. The term "monolithic" may describe a body which is cast, machined, additively manufactured and/or otherwise formed as a single, integral unit. By contrast, a non-monolithic body includes multiple bodies which are separately formed and then mechanically fastened and/or otherwise attached to one another after the formation of those bodies. Of course, in other embodiments, it is contemplated one or more elements (e.g., 110, 112, 114, 116, 118 and/or 120) of each fuel-air mixer 66 or mixer body 98 may be discretely formed and then attached to one another. The present disclosure therefore is not limited to such an exemplary monolithic configuration.

The fuel-air mixer 66 may be included in various turbine engines other than the one described above. The fuel-air mixer 66, for example, may be included in a geared turbine engine where a geartrain connects one or more shafts to one or more rotors in a fan section, a compressor section and/or any other engine section. Alternatively, the fuel-air mixer 66 may be included in a turbine engine configured without a geartrain; e.g., a direct drive turbine engine. The fuel-air mixer 66 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
   a plurality of fuel-air mixers arranged circumferentially about a common centerline, each of the plurality of fuel-air mixers comprising a first fuel-air mixer, and the first fuel-air mixer including a mixer stem and a mixer body, a centerline axis being defined along the mixer body of each fuel-air mixer, an axially aft end portion of each fuel-air mixer extending through an annular combustor bulkhead;
   the mixer stem connected to and projecting radially out from the mixer body;
   the mixer body including an inner passage, a sidewall, a fuel nozzle, an air swirler and a first quench aperture, the first quench aperture extending through a portion of the sidewall which diverges radially away from the centerline axis;
   the inner passage extending axially along the centerline axis within the first fuel-air mixer;
   the sidewall extending circumferentially around and axially along the inner passage;
   the fuel nozzle configured to direct fuel into the inner passage;
   the air swirler configured to direct swirled air into the inner passage for mixing with the fuel; and
   the first quench aperture configured to direct quench air into the inner passage to quench combustion products generated by combusting a mixture of the fuel and the swirled air within the inner passage.

2. The apparatus of claim 1, wherein the first quench aperture extends radially through the sidewall to the inner passage.

3. The apparatus of claim 1, wherein the first quench aperture has an elongated cross-sectional geometry.

4. The apparatus of claim 1, wherein the first quench aperture has a regular cross-sectional geometry.

5. The apparatus of claim 1, wherein the first quench aperture is one of a plurality of first quench apertures configured to direct the quench air into the inner passage to quench the combustion products; and the plurality of first quench apertures are arranged circumferentially about the centerline axis in a first array.

6. The apparatus of claim 5, wherein the first fuel-air mixer further includes a plurality of second quench apertures arranged circumferentially about the centerline axis in a second array; the plurality of second quench apertures are configured to direct additional quench air into the inner passage to further quench the combustion products; and the second array is axially offset from the first array along the centerline axis.

7. The apparatus of claim 1, wherein the first fuel-air mixer extends axially along the centerline axis to a mixer end; and the inner passage radially tapers towards the centerline axis as the inner passage extends axially along the centerline axis away from the air swirler and towards the mixer end.

8. The apparatus of claim 1, wherein the first fuel-air mixer extends axially along the centerline axis to a mixer end; and the inner passage radially expands away from the centerline axis as the inner passage extends axially along the centerline axis away from the air swirler and towards the mixer end.

9. The apparatus of claim 1, wherein the air swirler is configured as a radial air swirler.

10. The apparatus of claim 1, wherein the first fuel-air mixer extends axially along the centerline axis between an upstream mixer end and a downstream mixer end; and the air swirler is arranged axially between the fuel nozzle and the downstream mixer end.

11. The apparatus of claim 1, wherein the first fuel-air mixer extends axially along the centerline axis between an upstream mixer end and a downstream mixer end; and the fuel nozzle is arranged axially between the air swirler and the downstream mixer end.

12. The apparatus of claim 1, wherein the fuel nozzle includes a plurality of fuel outlets arranged in an array about the centerline axis; and a first of the plurality of fuel outlets is configured to inject the fuel in a radial inward direction into the inner passage towards the centerline axis.

13. The apparatus of claim 1, wherein
   the first fuel-air mixer further includes a plurality of cooling apertures extending through the sidewall; and
   a first of the plurality of cooling apertures is configured to direct cooling air into the inner passage in an axial direction.

14. The apparatus of claim 1, wherein
   the first fuel-air mixer further includes a plurality of cooling apertures extending through the sidewall; and
   a first of the plurality of cooling apertures is configured to direct cooling air into the inner passage in a radial direction.

15. The apparatus of claim 1, wherein
   the first fuel-air mixer further includes a shell and a cooling cavity radially between the shell and the sidewall;
   the shell extends axially along and circumferentially about the sidewall; and
   the shell includes one or more cooling apertures configured to direct cooling air into the cooling cavity to impinge against the sidewall.

16. The apparatus of claim 15, wherein the first quench aperture receives the quench air from the cooling cavity.

17. An apparatus for a turbine engine, comprising:

a fuel-air mixer including an inner passage, a sidewall, a fuel nozzle, an air swirler, a plurality of quench apertures, and a plurality of cooling apertures, the fuel-air mixer extending axially along an axis between an upstream mixer end and a downstream mixer end;

the inner passage extending axially along the axis within the fuel-air mixer;

the sidewall forming an outer peripheral boundary of the inner passage within the fuel-air mixer;

the fuel nozzle including a plurality of fuel outlets arranged in an array about the axis, and each of the plurality of fuel outlets configured to inject fuel in a radial inward direction into the inner passage towards the axis;

the air swirler configured to direct swirled air into the inner passage to mix with the fuel;

the plurality of cooling apertures extending through the sidewall, each of the plurality of cooling apertures configured to direct cooling air into the inner passage, and the plurality of cooling apertures arranged axially between the air swirler and the upstream mixer end along the axis, the plurality of quench apertures configured to direct quench air into the inner passage to quench combustion products generated by combusting a mixture of the fuel and the swirled air, wherein a first quench aperture of the plurality of quench apertures is positioned axially forward of a second quench aperture of the plurality of quench apertures.

18. An apparatus for a turbine engine, comprising:

a fuel-air mixer including an inner passage, a sidewall, a fuel nozzle, an air swirler, a shell, a cooling cavity formed radially between the sidewall and the shell, and a quench aperture;

the inner passage extending axially along a centerline axis within the fuel-air mixer;

the sidewall forming an outer peripheral boundary of the inner passage within the fuel-air mixer;

the fuel nozzle configured to direct fuel into the inner passage;

the air swirler fluidly coupled with and downstream of the cooling cavity, the cooling cavity directing air into the air swirler, the air swirler configured to swirl the air to provide swirler air, and the air swirler configured to direct the swirled air into the inner passage to mix with the fuel;

the shell extending axially along and circumferentially about the sidewall, and the shell including one or more cooling apertures configured to direct cooling air radially into the cooling cavity to impinge against the sidewall; and the quench aperture configured to direct quench air into the inner passage to quench combustion products generated by combusting a mixture of the fuel and the swirled air, wherein the quench aperture is defined through a portion of the sidewall which expands radially away from the centerline axis.

19. The apparatus of claim 18, wherein the quench aperture is fluidly coupled with and extends between the cooling cavity and the inner passage.

* * * * *